(12) United States Patent
Pohl et al.

(10) Patent No.: US 11,207,659 B2
(45) Date of Patent: Dec. 28, 2021

(54) METHOD FOR PREPARING MONOLITHIC COATED SURFACES

(71) Applicant: DIONEX CORPORATION, Sunnyvale, CA (US)

(72) Inventors: Christopher A. Pohl, Union City, CA (US); John M. Riviello, Los Gatos, CA (US)

(73) Assignee: DIONEX CORPORATION, Sunnyvale, CA (US)

( * ) Notice: Subject to any disclaimer, the term of this patent is extended or adjusted under 35 U.S.C. 154(b) by 455 days.

(21) Appl. No.: 16/166,058

(22) Filed: Oct. 19, 2018

(65) Prior Publication Data

US 2019/0283000 A1    Sep. 19, 2019

Related U.S. Application Data

(60) Provisional application No. 62/643,658, filed on Mar. 15, 2018.

(51) Int. Cl.
| | |
|---|---|
| *B01J 20/28* | (2006.01) |
| *B01J 20/26* | (2006.01) |
| *G01N 1/40* | (2006.01) |
| *B01L 3/00* | (2006.01) |
| *B01J 20/32* | (2006.01) |
| *B01J 20/281* | (2006.01) |

(52) U.S. Cl.
CPC ....... *B01J 20/28009* (2013.01); *B01J 20/261* (2013.01); *B01J 20/267* (2013.01); *B01J 20/28045* (2013.01); *B01J 20/321* (2013.01); *B01J 20/3204* (2013.01); *B01J 20/3272* (2013.01); *B01J 20/3282* (2013.01); *B01J 20/3291* (2013.01); *B01L 3/508* (2013.01); *G01N 1/405* (2013.01); *G01N 30/482* (2013.01); *B01L 2300/0803* (2013.01); *B01L 2300/123* (2013.01); *B01L 2300/16* (2013.01)

(58) Field of Classification Search
CPC ..... B01N 1/405; B01L 3/508; B01L 2300/16; B01L 2300/123; B01L 2300/0803
See application file for complete search history.

(56) References Cited

U.S. PATENT DOCUMENTS

| | | | |
|---|---|---|---|
| 5,334,310 | A | 8/1994 | Frechet et al. |
| 5,453,185 | A | 9/1995 | Frechet et al. |
| 5,691,206 | A | 11/1997 | Pawliszyn |

(Continued)

FOREIGN PATENT DOCUMENTS

| | | |
|---|---|---|
| CN | 101362075 A | 2/2009 |
| EP | 1188736 A1 | 3/2002 |

OTHER PUBLICATIONS

Huang et al., "A novel stir bar sorptive extraction coating based on monolithic material for apolar, polar organic compounds and heavy metal ions", Talanta 78 (2009), pp. 101-106.

(Continued)

*Primary Examiner* — Christopher Adam Hixson
(74) *Attorney, Agent, or Firm* — David A. Schell

(57) ABSTRACT

A carrier for adsorption a compound, comprising a support; and a shrink-fitted monolithic body attached to and surrounding at least a portion of the support. The monolithic body can be porous and configured to bind compounds in a solution either for the isolation or depletion of the compounds from the solution.

16 Claims, 8 Drawing Sheets

(56) References Cited

U.S. PATENT DOCUMENTS

| | | |
|---|---|---|
| 5,728,457 A | 3/1998 | Frechet et al. |
| 6,197,597 B1 | 3/2001 | Tuunanen |
| 6,210,570 B1 * | 4/2001 | Holloway .............. B01J 20/103 |
| | | 210/198.2 |
| 7,473,367 B2 | 1/2009 | Xie |
| 9,283,544 B2 | 3/2016 | Kabir et al. |
| 2010/0038298 A1 | 2/2010 | Angelini et al. |

OTHER PUBLICATIONS

Huang et al., "Preparation of stir bars for sorptive extraction based on monolithic material", Journal of Chromatography A, 1154 (2007), pp. 152-157.

Flook et al., "Reversed-phase monoliths prepared by UV polymerization of divinylbenzene", J. Sep. Sci. 2011, 34, pp. 2047-2053.

Shirey et al., "SPME-LC Fibers for a Variety of Applications", Posters, 2011, https://www.sigmaaldrich.com/content/dam/sigma-aldrich/docs/Supelco/Posters/1/t411041h.pdf.

Xie et al., "High-throughput polymer monolith in-tip SPME fiber preparation and application in drug analysis", Bioanalysis (2011), 3 (23), pp. 2613-2625.

* cited by examiner

METHOD FOR PREPARING MONOLITHIC COATED SURFACES

CROSS REFERENCE TO RELATED APPLICATION

This application claims, under 35 U.S.C. § 119(e), the right of priority to and the benefit of the filing date of co-pending U.S. Provisional Application No. 62/643,658, which was filed on Mar. 15, 2018. The disclosure of the foregoing application is incorporated herein by reference in its entirety.

FIELD

The present disclosure generally relates to the field of sample analysis, particularly methods and systems method for preparing and using monolithic coated surfaces.

Introduction

Detection of target compounds in a mixture has numerous applications, from detecting contaminants in our food supply and drinking water, detecting use of banned substances, ensuring medications and dietary supplements contain the appropriate amount of active ingredients, among other things. When detecting minute amounts of a compound, such as a heavy metal in a water sample, it may be necessary to concentrate the compound to aid in detection and quantitation. In other situations, there may be many other compounds in a sample that can interfere with detection of the target compound, such as testing for residual pesticides in baby food, and separation of the target compound from the interfering compounds can be necessary.

In order to accomplish the desired detection and quantification, a series of steps can be performed on a sample to concentrate and/or isolate the target compound. These can include solvent extractions, concentrating or drying a sample, centrifugation to remove solid particulates, and the like. Performing a series of steps to prepare for detecting the target compound can be time consuming and lead to errors.

U.S. Pat. No. 6,197,597 describes a separating agent, such as an antibody, bound to the surface of a solid body for the purpose of performing an immunoassay. However, many compounds are not suitable for detection by immunoassay as they may be too small to bind specifically to an antibody or an appropriate antibody may not be known.

U.S. Pat. No. 5,691,206 describes a coated fiber for solid phase extraction. While the fiber has the ability to bind a target compound, the capacity of the fiber is limited by the thin coating of material on the fiber.

As such, there is a need for tools and methods to simplify sample preparation and aid in the accurate detection and quantification of target compounds in a more efficient manner.

SUMMARY

In a first aspect, a carrier for adsorption a compound can include a support and a shrink-fitted monolithic body attached to and surrounding at least a portion of the support.

In various embodiments of the first aspect, the shrink-fitted monolithic body can be porous.

In various embodiments of the first aspect, the support is a rod.

In various embodiments of the first aspect, the support is a magnet or polymer coated magnet.

In various embodiments of the first aspect, the shrink-fitted monolithic body can have an average thickness of not less than about 0.5 millimeters, such as not less than about 0.75 mm, even not less than about 1.0 millimeters. In particular embodiments, the shrink-fitted monolithic body can have an average thickness of not greater than about 100 millimeters.

In a second aspect, a system for testing a sample for the presence of a compound can include a carrier and a container. The carrier can include a support and a shrink-fitted monolithic body attached to and surrounding at least a portion of the support. The container can include a cavity for holding a sample. The shrink-fitted monolithic body sized to fit within the cavity and to be in contact with the sample.

In various embodiments of the second aspect, the support can be a rod.

In various embodiments of the second aspect, the support can be a magnet or polymer coated magnet.

In various embodiments of the second aspect, the shrink-fitted monolithic body can have an average thickness of not less than about 0.5 millimeters, such as not less than about 0.75 mm, even not less than about 1.0 millimeter. In particular embodiments, the shrink-fitted monolithic body can have an average thickness of not greater than about 100 millimeters.

In various embodiments of the second aspect, the shrink-fitted monolithic body can conform to the shape of the cavity.

In a third aspect, a method for producing a carrier can include positioning a support within a cavity; filing the cavity with a solution, the solution including a monomer and an initiator mixture; applying energy to the solution to cause polymerization of the monomer to form a monolith, wherein monolith shrinks during polymerization and curing and the shrinkage adheres the monolith to the support; and removing the support with the attached monolith.

In various embodiments of the third aspect, the positioning can include centering the support within the cavity.

In various embodiments of the third aspect, the solution further can include a porogen.

In various embodiments of the third aspect, the energy can include thermal energy or electromagnetic energy.

In various embodiments of the third aspect, the support can be a rod.

In various embodiments of the third aspect, the support can be a magnet or polymer coated magnet.

In various embodiments of the third aspect, the shrink-fitted monolithic body can have an average thickness of not less than about 0.5 millimeters, such as not less than about 0.75 mm, even not less than about 1.0 millimeter. In particular embodiments, the shrink-fitted monolithic body can have an average thickness of not greater than about 100 millimeters.

In various embodiments of the third aspect, the shrink-fitted monolithic body can conform to the shape of the cavity.

In a fourth aspect, a method of determining the presence of a compound in a solution can include adding the solution to a container, and inserting a carrier into the container. The carrier can include a support and a shrink-fitted monolith adhered to the substrate. The shrink-fitted monolith can be in contact with the solution. In various embodiments, the method can include adsorbing the compound to the shrink-fitted monolith; removing the shrink-fitted monolith from the solution in the container; providing the compound to a detector; and detecting and/or quantifying the amount of the compound in the solution based on an output of the detector.

Alternatively, the method can include adsorbing interfering compounds to the shrink-fitted monolith; removing the shrink-fitted monolith from the solution in the container; providing the solution to the detector; and detecting and/or quantifying the amount of the compound in the solution based on an output of the detector.

In various embodiments of the fourth aspect, the substrate can be a rod.

In various embodiments of the fourth aspect, the substrate can be a magnet or polymer coated magnet.

In various embodiments of the fourth aspect, the shrink-fitted monolithic body can have an average thickness of not less than about 0.5 millimeters, such as not less than about 0.75 mm, even not less than about 1.0 millimeter. In particular embodiments, the shrink-fitted monolithic body can have an average thickness of not greater than about 100 millimeters.

In various embodiments of the fourth aspect, the shrink-fitted monolithic body can conform to the shape of the container.

In various embodiments of the fourth aspect, the detector can include a mass spectrometer.

In various embodiments of the fourth aspect, the detector can include a liquid chromatography system. In particular embodiments, the liquid chromatography system can include an optical detector, a flame ionization detector, or any combination thereof. In particular embodiments, the optical detector can include a UV detector, an IR detector, a visible light detector, a Raman detector, or any combination thereof.

In various embodiments of the fourth aspect, the detector can include a scintillation counter, an X-ray fluorescence detector, or any combination thereof.

In various embodiments of the fourth aspect, the detector can include a charged aerosol detector, a flame ionization detector, an aerosol-based detector, a flame photometric detector, an atomic-emission detector, a nitrogen phosphorus detector, an evaporative light scattering detector, an electrolytic conductivity detector, a MIRA detector, or any combination thereof.

In various embodiments of the fourth aspect, providing the compound to the detector can include removing the compound from the shrink-fitted monolith to the detector. In particular embodiments, removing the compound from the shrink-fitted monolith to the detector can include eluting the compound into a solution and providing the solution to the detector.

In various embodiments of the fourth aspect, providing the compound to the detector can include providing the carrier and the adhered compound to the detector.

In various embodiments of the fourth aspect, providing the compound to the detector can include transferring the adhered compound from the carrier into the detector.

DRAWINGS

For a more complete understanding of the principles disclosed herein, and the advantages thereof, reference is now made to the following descriptions taken in conjunction with the accompanying drawings and exhibits, in which.

Figure 1:
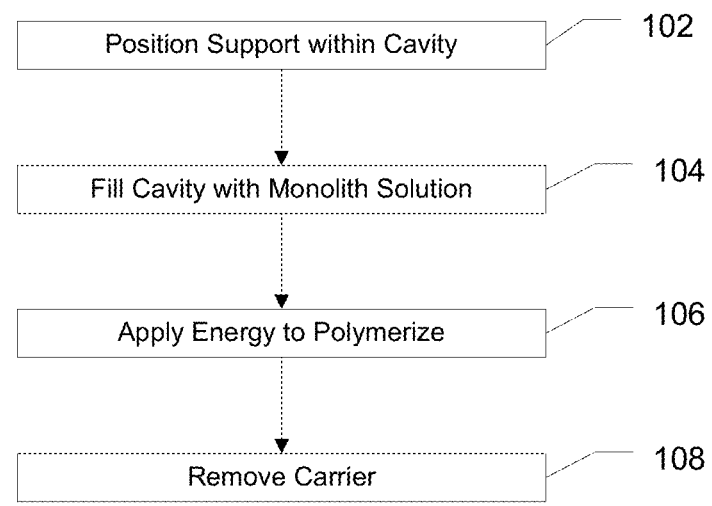
FIG. 1 is a flow diagram illustrating an exemplary method for manufacturing carriers, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of systems and methods for analyteisolation are described herein and in the accompanying exhibits.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

FIG. 1 is a flow diagram illustrating a method 100 of forming a carrier. At 102, a support can be placed within a cavity, and, at 104, the cavity can be filled with a solution. In various embodiments, the cavity can be filled with the solution prior to placement of the support. In various embodiments, the support can be a rod or similar shaped support structure that extends from the carrier. In various embodiments, the support can be made of a polymer, polymer coated metal, a magnet, a polymer coated magnet, or the like. In various embodiments, the polymer can include a thermoplastic such as polyether ether ketone (PEEK), poly (methyl methacrylate) (PMMA), polyamide, polycarbonate, polyethylene, polyvinyl chloride, polyphenylene oxide, polyphenylene sulfide, polypropylene, polytetrafluoroethylene (PTFE), and the like. In various embodiments, the support or at least a coating on the surface of the support can be inert to prevent reactions with the polymer, the monomer solution or the sample solution.

In various embodiments, the solution can include a monomer and an initiator. In various embodiments, the monomer, for example, can be divinylbenzene. In various embodiments, the initiator can be a free radical initiator, such as azobisisobutyronitrile. In particular embodiments, the solution can also include a porogen. Various other chemistries that are adaptable for use in the formation of the shrink-fitted monolith are known in the art, such as, for example European Patent 1,188,736 which describes a method of making porous poly(ethylene glycol methacrylate-co-ethylene glycol dimethacrylate) by in situ copolymerization of a monomer, a crosslinking agent, a porogenic solvent and an initiator, U.S. Pat. Nos. 5,334,310; 5,453,185 and 5,728,457 which disclose methods of making macroporous poly(glycidyl methacrylate-co-ethylene glycol dimethacrylate) polystyrene, and U.S. Pat. No. 7,473,367 which discloses permeable polymeric monolithic materials prepared in a plastic column casing, all of which are incorporated by reference for all purposes.

At 106, energy can be applied to the solution to trigger polymerization to form a monolith. In various embodiments, the energy can be UV or visible light, X-rays, gamma rays, or other types of radiation. For example, a UV initiated process for producing monoliths is disclosed in Flook, K., Agroskin, Y., Pohl, C., Reversed-phase monoliths prepared by UV polymerization of divinylbenzene. Journal of Separation Science 2011; 34(16-17): p. 2047-2053 and U.S. Pat. Appl. No. 2010/0038298 A1 discloses preparing monolithic columns with a gamma radiation-induced polymerization process. In other embodiments, thermal energy can be applied to induce polymerization. For example, U.S. Pat. No. 7,473,367 which discloses preparing monolithic columns using a thermal polymerization process. The energy applied and the time can be controlled to achieve the desired degree of polymerization. In various embodiments, during polymerization and curing of the monolith, the polymer can shrink, thereby releasing from the cavity and adhering to the support.

In other embodiments, the support can be a disk or other shape that can be fully encapsulated within the carrier. The support can be suspended within the cavity so as to not contact the cavity walls, such as by using magnetic levitation or solution viscosity to prevent settling of the support during polymerization. Alternatively, the support can be placed within the filled cavity and the cavity can be rapidly rotated or tumbled to keep the support centered within the cavity during polymerization.

At 108, the carrier, including the support and the attached shrink-fitted monolith, can be removed from the cavity. In various embodiments, the monolithic porous polymer can have a surface area in a range of about 20 $m^2/g$ to about 900 $m^2/g$.

Figure 2:
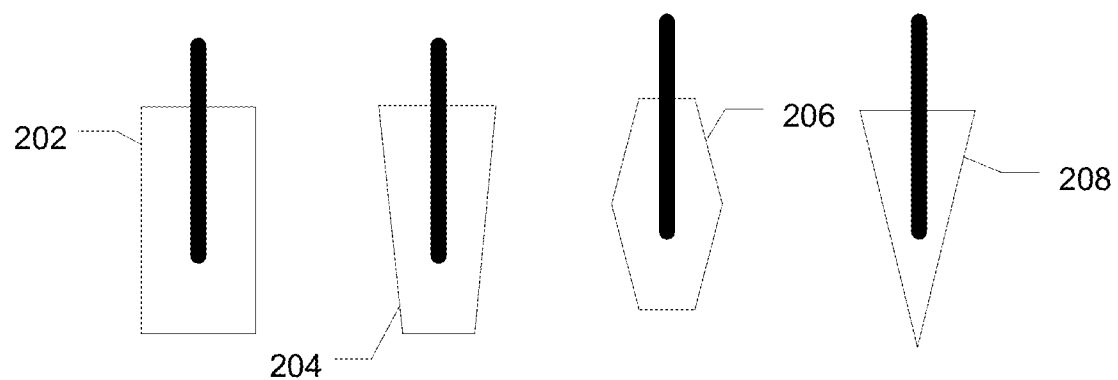
FIG. 2 is a cross section of a carrier along the length of the support illustrating various monolith shapes, in accordance with various embodiments.

In various embodiments the monolith can take on the shape of the cavity. FIG. 2 illustrates various cross-sectional shapes. Cross section 202 illustrates a monolith with a rectangular cross section, such as a cylinder, where the side surfaces are parallel and the bottom surface is flat. Cross section 204 illustrates a trapezoidal cross section where the side surfaces are tapered. Cross section 204 retains the flat bottom of cross section 202.

Cross section 206 illustrates a higher order polygonal cross section where the greatest width is in the middle with a narrower top and bottom. Cross section 206 can be produced with a two part cavity such that the cavity can be separated for removal of the monolith. Cross section 206 also retains the flat bottom of cross section 202 and 204.

Cross section 208 illustrates a triangular cross section where sides taper to a point at the bottom.

In various embodiments, cross-sections 202, 204, and 206 can be modified such that the bottom surface is curved with either a concave of convex curvature. Additionally, the side surfaces can be curved with either a concave of convex curvature.

Figure 3A:
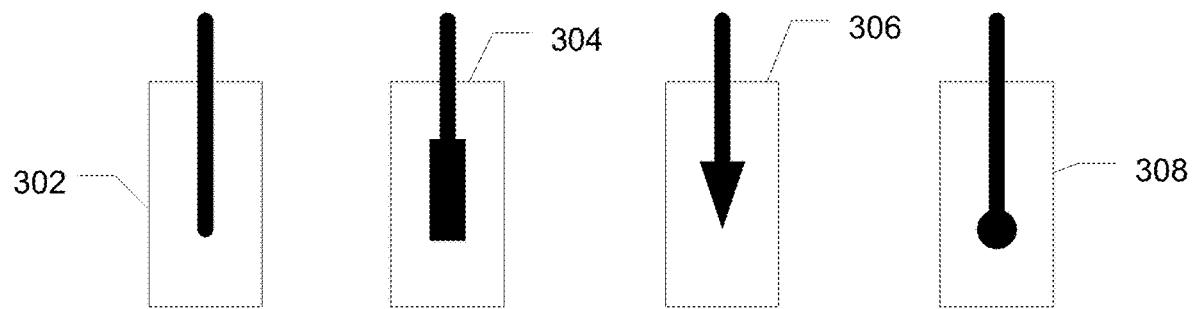
FIG. 3A is a cross section of a carrier along the length of the support illustrating various support structures, in accordance with various embodiments.

FIG. 3 illustrates various end treatments of the support. In various embodiments, such as cross section 302 where the support has a rectangular cross section, the monolith can be held onto the support by the adhesion from the shrinkage of the monolith during curing. In other embodiments, such as cross sections 304, 306, and 308, the end of the support can be modified to reduce the likelihood the support can be withdrawn from the monolith. For example, in cross section 304, the end portion of the support can be widened with a larger rectangular portion. In various embodiments, the widened rectangular portion can represent various enlargements such as a rectangular or triangular prism or an enlarged cylinder located at the support end. In other embodiments, the end portion can be flattened in one dimension orthogonal to the length of the support to widen the support in a second orthogonal dimension.

Cross section 306 shows a triangular end modification. The triangular cross section can represent a pyramidal modification or a conical modification of the support end. Cross section 308 shows a circular end modification, such as a ball or disc at the end of the support.

In other embodiments, the end portion can be modified to form other shapes as would be obvious to one skilled in the art and still within the scope of this disclosure.

Because the monolith is formed in the presence of the support, narrower space for the upper portion of the support can substantially prevent the withdrawal of the end portion with the larger or differently shaped cross section.

Figure 3B:
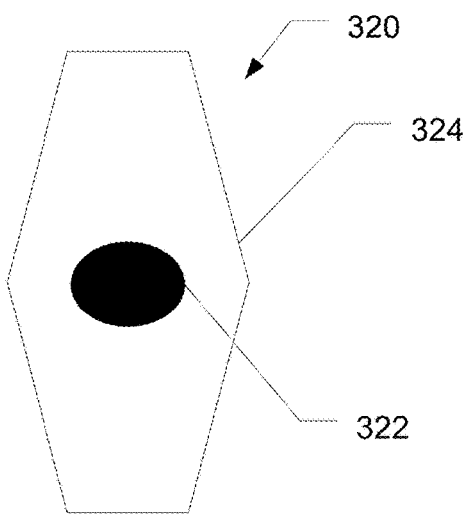
FIG. 3B is a cross section of a carrier illustrating a fully encapsulated support, in accordance with various embodiments.

FIG. 3B illustrates an exemplary carrier 320 in which a support 322 is fully encapsulated with monolith 324. Rather than holding the support by a portion sticking out of the carrier, carrier 320 can be formed by suspending support 322 within the polymerization while forming the monolith. For example, support 322 can be a magnet, or polymer coated magnet, and can be suspending using magnetic levitation during polymerization of the monolith. While support 322 is illustrated as an ovoid or disc, various alternative shapes, including cylinders, pyramids, cuboids, other convex and concave polyhedrons, and the like can provide suitable supports for embedding within the monolith.

Figure 4:
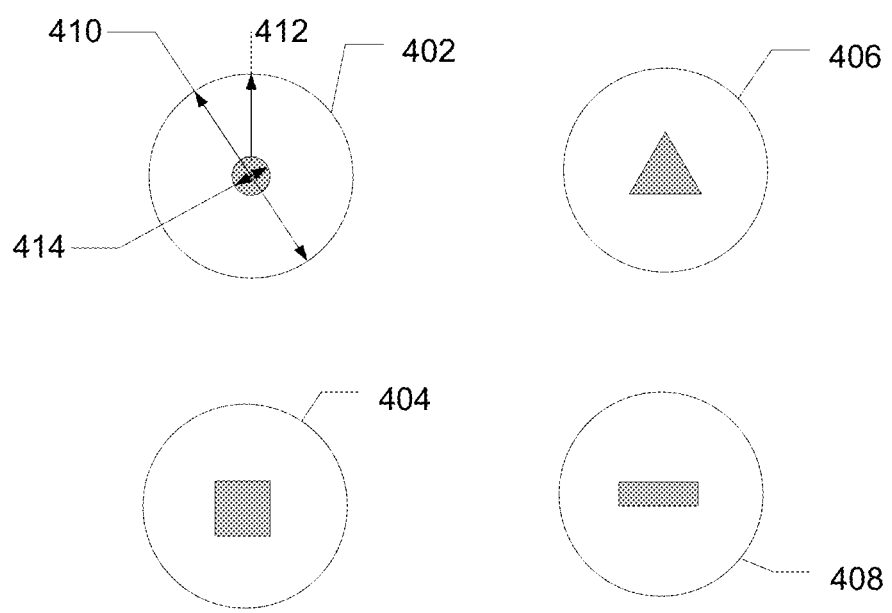
FIG. 4 is a cross section of a carrier perpendicular to the length of the support illustrating various support cross sections, in accordance with various embodiments.

FIG. 4 illustrates various support shapes, represented by cross sections perpendicular to the length of the support. Cross section 402 illustrates a support with a circular cross section, such as a cylinder. Cross sections 404, 406, and 408 illustrate alternatives to a cylindrical rod, such as a square rod (cross section 404), a triangular rod (cross section 406), and a rectangular rod (cross section 408).

FIG. 4 also illustrated the thickness of the monolith. The overall width 410 of the monolith can be measured from one outer surface to an opposite outer surface. The thickness 412 of the monolith can be measured from the outer surface of the support to the outer surface of the monolith. In various embodiments, the thickness 412 of the monolith can be not less than about 0.5 millimeters, such as not less than about 0.75 millimeters, such as not less than about 1.0 millimeters. Additionally, the thickness 412 may be not greater than about 100 millimeters, such as not greater than about 50 millimeters, even not greater than about 25 millimeters. Generally, if the thickness 412 of the monolith is too small, there will be insufficient adhesion between the support and the monolith as the degree of shrinkage is dependent on the thickness of the monolith.

Generally, the overall width of the monolith can be between about 1.0 millimeter to about 300 millimeters, such as between about 1.5 millimeters to about 200 millimeters, even between about 2.0 millimeters and about 75 millimeters.

In various embodiments, the ratio of the thickness of the monolith to the diameter of the support can be in a range of about 1:2 to about 50:1, such as between about 1:1 to about 25:1, even between about 2:1 to about 10:1.

There can be a relationship between the size of the monolith and the adsorption capacity of the carrier, with a larger monolith having a greater capacity to adsorb a target compound. However, as the thickness of the monolith increases, the time to equilibrate with the solution (diffusion of the compound through the monolith) increases, as does the time to extract or elute the compound from the monolith. In various embodiments, for large monoliths, increasing the diameter of the support 414 while maintaining the same thickness 412 of the monolith can increase the capacity of the monolith while minimizing changes to the equilibration time. However, maintaining the support diameter 414 while increasing the monolith thickness 412 can provide a greater increase in capacity for a given monolith width 410 at the cost of equilibration time.

Figure 5:
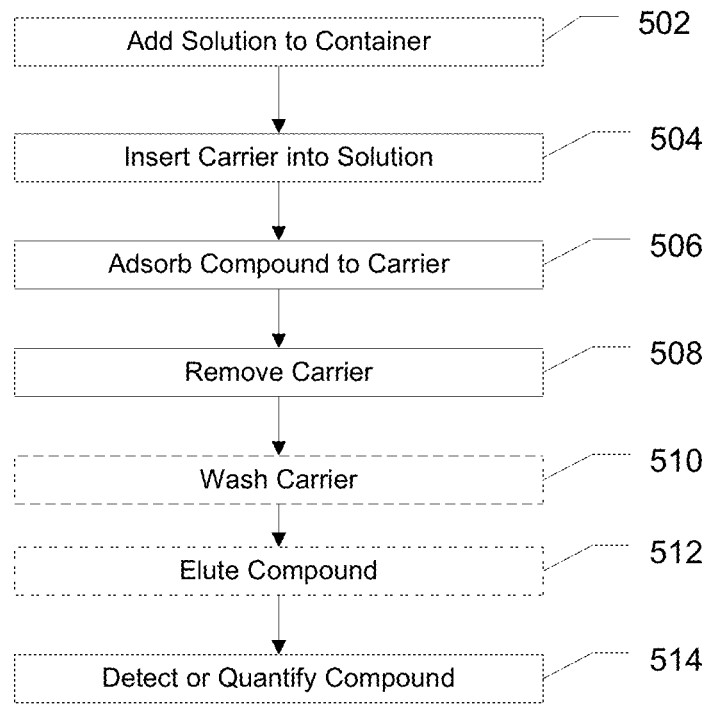
FIGS. 5 and 6 are flow diagrams illustrating exemplary methods for detecting and/or quantifying compounds in a sample, in accordance with various embodiments.

FIG. 5 illustrates an exemplary use case for the carrier. At 502, a sample solution can be added to a container. In various embodiments, the sample solution can contain a compound of interest as well as additional compounds that may interfere with the detection of compound of interest in the sample.

Figure 7:
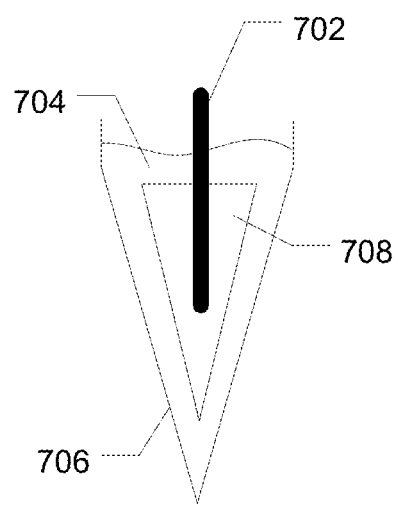
FIG. 7 is a diagram illustrating the carrier in use with a sample container, in accordance with various embodiments.

At 504, a carrier can be inserted into the solution within the container. FIG. 7 illustrates carrier 702 and solution 704 within the container 706. In various embodiments, the shape of the monolith 708 of the carrier 702 can conform to the shape of the container 706, thereby maximize the size of the monolith 708 for a given container 706. Alternatively, the monolith 708 shape may be different than the container 706 shape. Other shapes may improve the amount of surface area in contact with the solution. Other monolith shape and container shape combinations may improve other aspects, such as sample volume. Still further, the monolith 708 can have a generic shape for use with a variety of containers 706.

Returning to FIG. 5, at 506, the target compound can be adsorbed to the carrier. In various embodiments, the carrier may be moved within the container to mix the solution and decrease the time required for the compound to adsorb to the carrier. For example, the carrier may be rotated or be translated up and down or side to side to agitate the solution.

At 508, the carrier can be removed from the solution. Optionally, at 510, the carrier may be washed to remove any remaining solution as well as interfering compounds from the surface of the carrier. In various embodiments, washing the carrier can include dipping the monolith portion of the carrier into a wash solution. Preferably, the wash solution does not cause desorption of the target compound. Additionally, the carrier may be moved to agitate the wash solution.

Optionally, at 512, the target compound can be eluted from the carrier. In various embodiments, the carrier can be inserted into an elution solution that causes desorption of the target compound. The carrier may be moved within the elution solution to aid in desorption.

At 514, the compound can be detected and/or quantified. In various embodiments, the elution solution can be provided to a detector and a measurement of the target compound in the solution can be obtained. For example, the elution solution can be provided to a chromatography system, such as a liquid chromatography or gas chromatography system and the target compound can be measured after chromatographic separation. Alternatively, the elution solution can be provided directly to the detector without chromatographic separation.

Alternatively, the carrier can be provided to the detector for a measurement of the compound on the carrier without elution of the compound into a solution. For example, the target compound can be measured while adsorbed on the carrier. Alternatively, the target compound can be directly desorbed from the carrier to the detector, for example by applying an electric current, heat, a vacuum, or a combination thereof.

In various embodiments, the detector can be an optical detector, such as a UV/VIS detector, an IR detector, or a Raman detector, a flame ionization detector, flame photometric detector, a charged aerosol detector, aerosol-based detector, atomic-emission detector, nitrogen phosphorus detector, evaporative light scattering detector, a mass spectrometer, an electrolytic conductivity detector, MIRA detector, an X-ray fluorescence detector, a scintillation counter, or the like.

Figure 6:
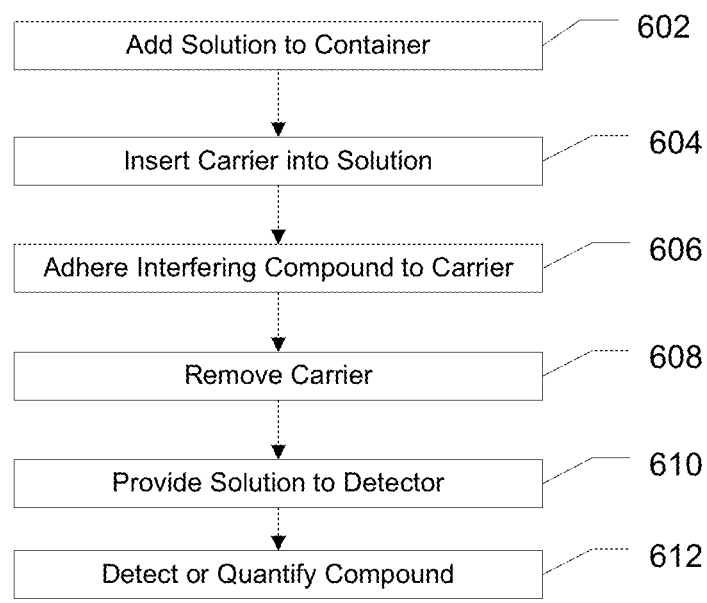

FIG. 6 illustrates another exemplary use case for the carrier. At 602, a sample solution can be added to a container. In various embodiments, the sample solution can contain a compound of interest as well as additional compounds that may interfere with the detection of compound of interest in the sample.

At 604, a carrier can be inserted into the solution within the container. At 606, interfering compounds can be adsorbed to the carrier. In various embodiments, the carrier may be moved within the container to mix the solution and decrease the time required for the interfering compound to adsorb to the carrier. For example, the carrier may be rotated or be translated up and down or side to side to agitate the solution.

At 608, the carrier can be removed from the solution, and 614, the compound can be detected and/or quantified. In various embodiments, the solution can be provided to a detector and a measurement of the target compound in the solution can be obtained.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

The embodiments described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The embodiments, described herein, also relate to a device or an apparatus for performing these operations. The systems and methods described herein can be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

EXAMPLES

Example 1A. Preparation of a Hydrophobic Monolith Carrier with a Non-Polar Porogen A polytetrafluoroethylene (PTFE) machined mold with a cavity dimension of 4.7 mm diameter and 38 mm in length is used with a 1.6 mm×89 mm polyetheretherketone (PEEK) carrier rod. The rod is geometrically deformed at one end by heating the PEEK to around the glass transition temperature of approximately 140° C. and then mechanically pressing the heated portion of the rod. The mechanically pressed portion is deformed to widen and flatten the rod and to emboss the rod with one or more groves to aid in anchoring the monolith. The support rod is placed into the cavity. A threaded fitting at the inlet of the PTFE machined mold centers the support rod in the cavity and also seals the cavity.

A solution consisting of technical grade divinylbenzene monomer (DVB, designated 55% pure and contained a polymerization inhibitor), n-heptane and a radical initiator, azobisisobutyronitrile (AIBN) is prepared. The porogen, n-heptane, is non-polar and is readily miscible with the DVB monomer. The n-heptane porogen is added at twice the mass of the DVB monomer. The AIBN initiator is added at approximately 1% of the DVB mass. The monomer-porogen-initiator (MPI) solution is then added to the cavity (0.4 mL), the support rod is inserted and the threaded fitting is attached to seal the cavity.

Figure 8:
FIG. 8 is a scanning electron micrograph of 2:1 n-heptane-DVB monolith at 47 μm full scale, in accordance with various embodiments.

The PTFE mold containing the MPI solution and support rod is placed in an oven at 65° C. for 24-48 hours to initiate the polymerization. After polymerization, the threaded fitting is removed and the support rod is extracted from the mold. As a result of the shrinking of the porous monolith during polymerization, the monolith is securely attached to the support rod. The thickness of the resulting porous monolith is 1.5 mm. FIG. 8 shows a scanning electron micrograph (SEM) of the resulting porous monolith.

Example 1B. Preparation of a Hydrophobic Monolith Carrier with a Polar Porogen

A polytetrafluoroethylene (PTFE) machined mold with a cavity dimension of 4.7 mm diameter and 38 mm in length is used with a 1.6 mm×89 mm polyetheretherketone (PEEK) carrier rod. The rod is geometrically deformed at one end by heating the PEEK to around the glass transition temperature of approximately 140° C. and then mechanically pressing the heated portion of the rod. The mechanically pressed portion is deformed to widen and flatten the rod and to emboss the rod with one or more groves to aid in anchoring the monolith. The support rod is placed into the cavity. A threaded fitting at the inlet of the PTFE machined mold centers the support rod in the cavity and also seals the cavity.

A solution consisting of technical grade divinylbenzene monomer (DVB, designated 55% pure and contained a polymerization inhibitor), dimethylformamide (DMF) and a radical initiator, azobisisobutyronitrile (AIBN) is prepared. The porogen, DMF, is slightly polar and is miscible with the DVB monomer. The DMF porogen is added at twice the mass of the DVB monomer. The AIBN initiator is added at approximately 1% of the DVB mass. The monomer-porogen-initiator (MPI) solution is then added to the cavity (0.4 mL), the support rod is inserted and the threaded fitting is attached to seal the cavity.

The PTFE mold containing the MPI solution and support rod is placed in an oven at 65° C. for 24-48 hours to initiate the polymerization. After polymerization, the threaded fitting is removed and the support rod is extracted from the mold. As a result of the shrinking of the porous monolith during polymerization, the monolith is securely attached to the support rod. The thickness of the resulting porous monolith is 1.5 mm. DMF produces smaller pores than n-heptane when used with DVB.

Example 2. Preparation of a Hydrophobic Monolith Carrier with a Moderately Polar Porogen A polytetrafluoroethylene (PTFE) machined mold with a cavity dimension of 4.7 mm diameter and 38 mm in length is used with a 1.6 mm×89 mm polyetheretherketone (PEEK) carrier rod. The rod is geometrically deformed at one end by heating the PEEK to around the glass transition temperature of approximately 140° C. and then mechanically pressing the heated portion of the rod. The mechanically pressed portion is deformed to widen and flatten the rod and to emboss the rod with one or more groves to aid in anchoring the monolith. The support rod is placed into the cavity. A threaded fitting at the inlet of the PTFE machined mold centers the support rod in the cavity and also seals the cavity.

A solution consisting of technical grade divinylbenzene monomer (DVB, designated 55% pure and contained a polymerization inhibitor), tetrahydrofuran (THF) and a radical initiator, azobisisobutyronitrile (AIBN) is prepared. The porogen, THF, exhibits moderately polarity and is miscible with the DVB monomer. The THF porogen is added at twice the mass of the DVB monomer. The AIBN initiator is added at approximately 1% of the DVB mass. The monomer-porogen-initiator (MPI) solution is then added to the cavity (0.4 mL), the support rod is inserted and the threaded fitting attached to seal the cavity.

Figure 9:
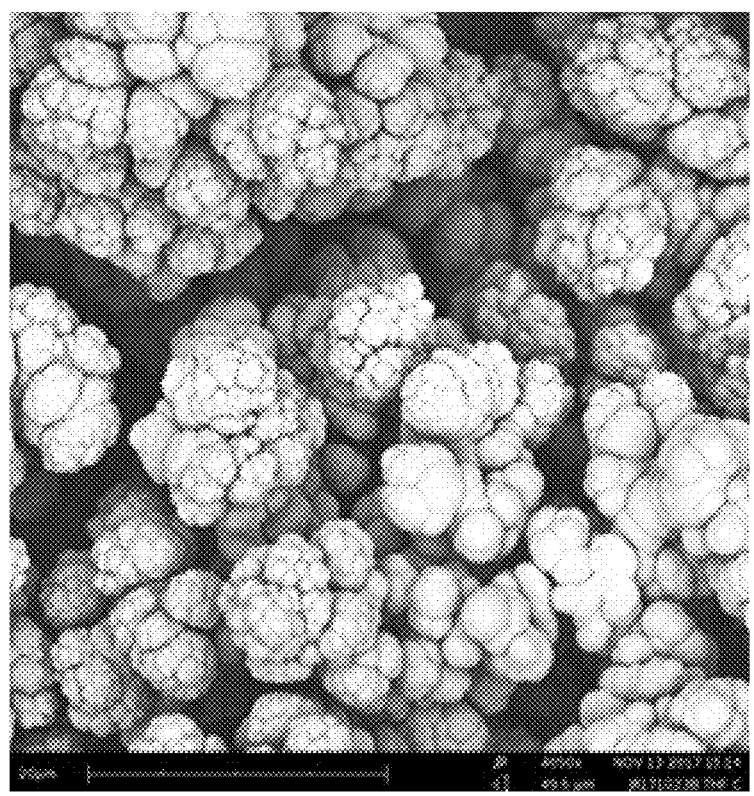
FIG. 9 is a scanning electron micrograph of 2:1 THF-DVB monolith at 47 μm full scale, in accordance with various embodiments.

The PTFE mold containing the MPI solution and support rod is placed in an oven at 65° C. for 24-48 hours to initiate the polymerization. After polymerization, the threaded fitting is removed and the support rod is extracted from the mold. As a result of the shrinking of the porous monolith during polymerization, the monolith is securely attached to the support rod. The thickness of the porous monolith is 1.5 mm. FIG. 9 shows a scanning electron micrograph (SEM) of the resulting porous monolith.

Example 3. Preparation of a Copolymer Porous Monolith with a Non-Polar Porogen

In examples 1 and 2, a carrier composed of a DVB porous polymer is described. In this example, a carrier with a porous copolymer consisting of two monomers, divinylbenzene and n-vinylpyrrolidone is described.

A polytetrafluoroethylene (PTFE) machined mold with a cavity dimension of 3.2 mm diameter and 38 mm in length is used with a 1.6 mm×89 mm polyetheretherketone (PEEK) carrier rod. The rod is geometrically deformed at one end by heating the PEEK to around the glass transition temperature of approximately 140° C. and then mechanically pressing the heated portion of the rod. The mechanically pressed portion is deformed to widen and flatten the rod and to emboss the rod with one or more groves to aid in anchoring the monolith. The support rod is placed into the cavity. A threaded fitting at the inlet of the PTFE machined mold centers the support rod in the cavity and also seals the cavity.

A solution consisting of technical grade divinylbenzene monomer (DVB, designated 55% pure and contained a polymerization inhibitor), n-vinylpyrrolidone monomer (VP), n-heptane as a porogen and a radical initiator, azobisisobutyronitrile (AIBN) is prepared. The mass ratio of DVB to VP is 5:1 (80% DVB and 20% VP). The mass ratio of the porogen, n-heptane to the total mass of the DVB and VP monomer solution is 2:1. The AIBN initiator is added at approximately 1%-2% of the total monomer mass. The monomer-porogen-initiator (MPI) solution is then added to the cavity (0.5 mL), the support rod is inserted and the threaded fitting is attached to seal the cavity.

Figure 10:
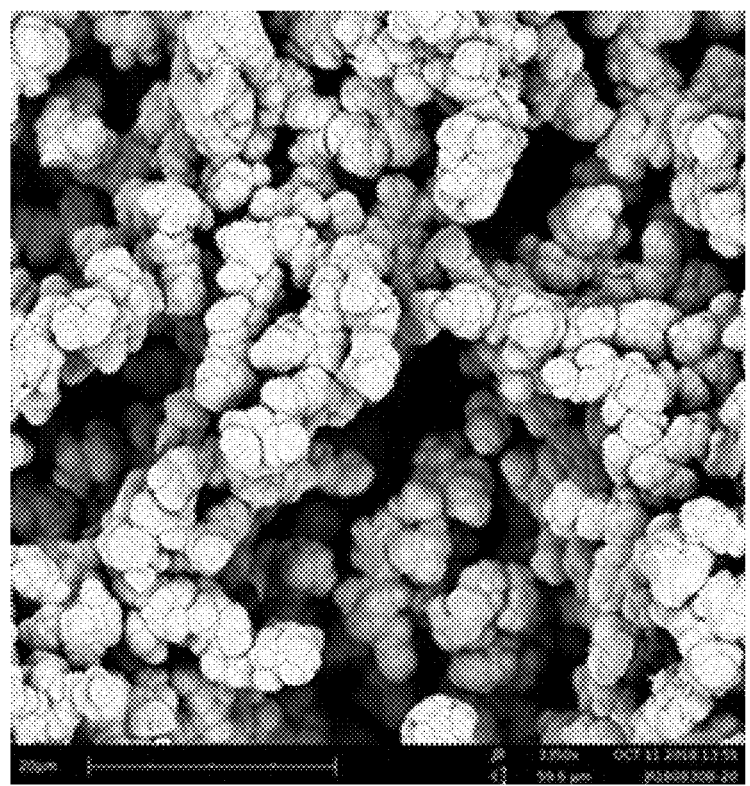
FIG. 10 is a scanning electron micrograph of 1.5:1 n-heptane-DVB/VP monolith at 60 μm full scale, in accordance with various embodiments.

The PTFE mold containing the MPI solution and support rod is placed in an oven at 65° C. for 24-48 hours to initiate the polymerization. After polymerization, the threaded fitting is removed and the support rod extracted from the mold. As a result of the shrinking of the porous monolith during polymerization, the monolith is securely attached to the support rod. The thickness of the resulting porous monolith is approximately 0.80 mm. FIG. 10 shows a scanning electron micrograph (SEM) of the resulting porous monolith.

Example 4. Extraction of Aromatic Analytes Using a Porous Monolith Carrier

A carrier of Example 1A is cleaned with acetone in an ultrasonic bath (3 acetone rinses, 5 minutes each in the ultrasonic bath) to remove residual porogen, oligomers, inhibitor or initiator from the porous monolith. The carrier is then dried in a 50° C. oven for ten minutes.

Figure 11:
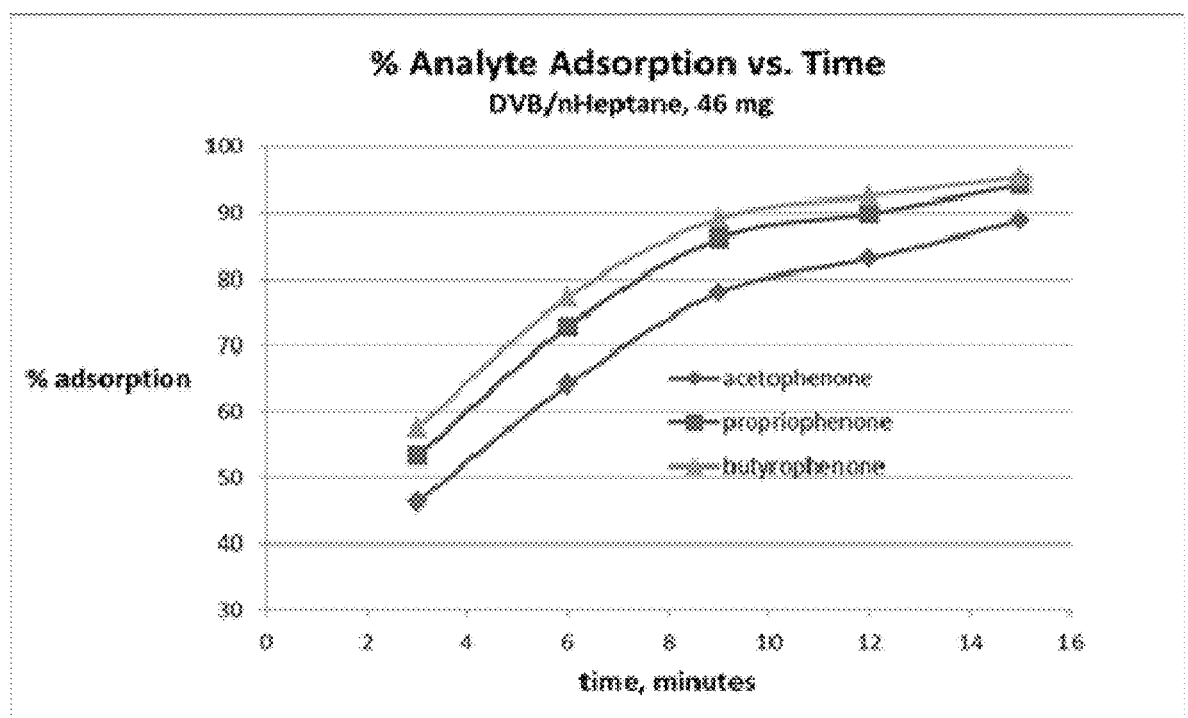
FIG. 11 shows the adsorption efficiency of a DVB/n-heptane porous monolith carrier for alkylphenones, in accordance with various embodiments.

A test solution of 5% methanol in water containing 10 μg/mL of three alkylphenones (acetophenone, propriophenone and butyrophenone) is used for evaluating the adsorption efficiency of the carrier of example 1. Reversed phase HPLC with UV detection is used to monitor the time dependent adsorption of the alkyphenones onto the carrier from the test solution. Prior to inserting the carrier into the test solution, the carrier is inserted into a 50% methanol/water solution to "wet" the surface of the hydrophobic porous monolith. After inserting the carrier into the test solution for 3 minutes, the carrier is removed and HPLC analysis used determine the concentration of the remaining alkyphenones. This process is repeated every three minutes up to fifteen minutes and the data shown in FIG. 11. This data show that aromatic, hydrophobic analytes are effectively retained on this type of carrier.

Example 5. Extraction of Caffeine from Coffee Using a Porous Monolith Carrier

Caffeine is an important indicator for the anthropogenic contamination of natural waters and its presence closely parallels more toxic contaminants such as fecal coliforms. Caffeine is relatively water soluble, hence a challenging molecule for retention on a hydrophobic carrier. Two carriers are tested for their ability to retain caffeine. The first carrier consists of a DVB/n-heptane porous monolith as described in Example 1A. The second carrier is a porous DVB monolith using dimethylformamide (DMF) as the porogen as described in Example 1B. After synthesis, both carriers are cleaned with acetone in an ultrasonic bath (3 acetone rinses, 5 minutes each in the ultrasonic bath) to remove residual porogen, oligomers, inhibitor or initiator from the porous monoliths. The carriers are then dried in a 50° C. oven for ten minutes.

Figure 12:
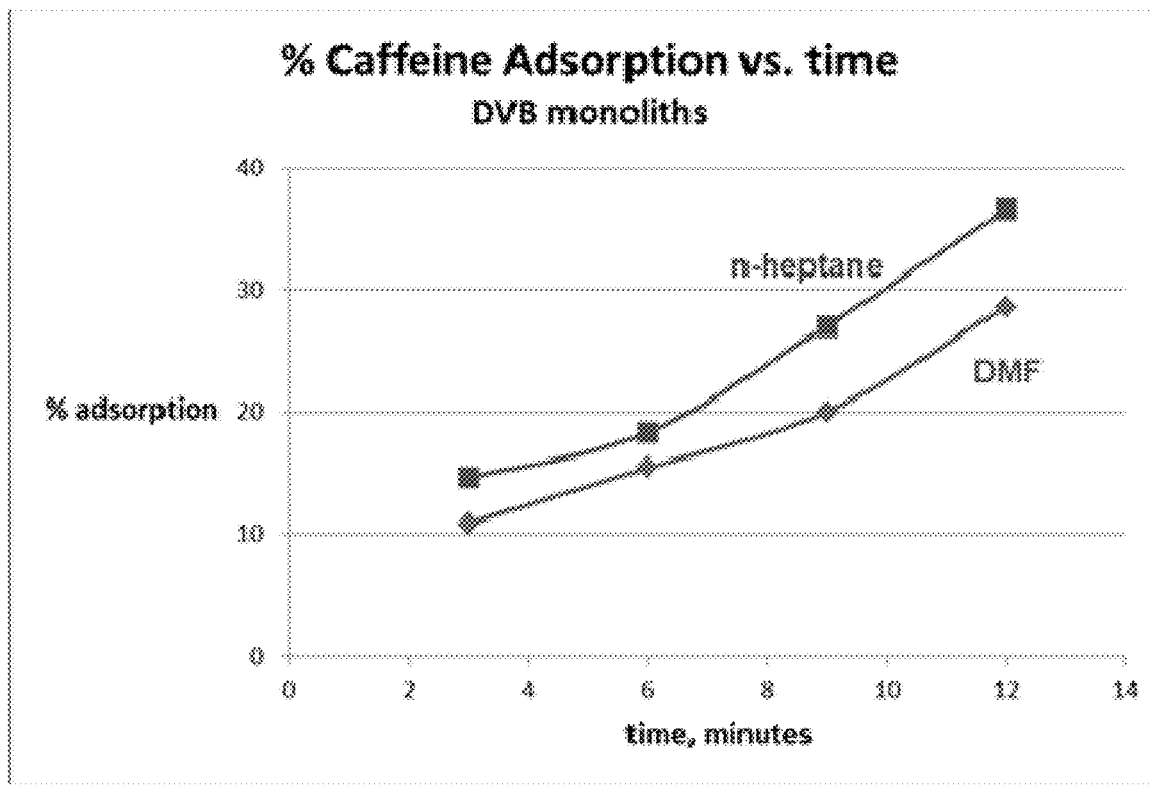
FIG. 12 shows the adsorption efficiency of a DVB/n-heptane and DVB/DMF porous monolith carriers for caffeine, in accordance with various embodiments.

A sample containing 100 ppm caffeine (in 5% methanol) is prepared. The DVB/n-heptane carrier (53 mg monolith not including the mass of the support) is placed in 5 mL of the caffeine solution and gently agitated and removed after three minutes. The remaining caffeine in the solution is then determined by HPLC and this process is repeated at 6, 9 and 12 minutes. The same procedure is followed for the DVB/DMF carrier (67 mg monolith not including the mass of the support). FIG. 12 shows the % adsorption of caffeine as a function of time.

Figure 13:
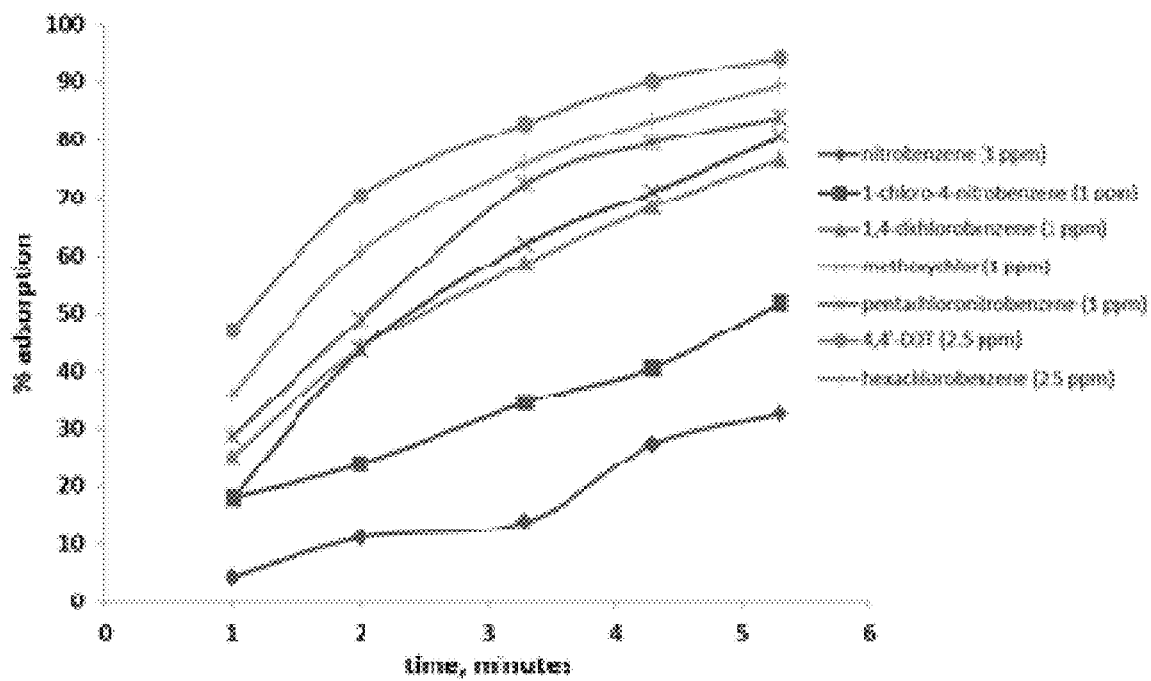
FIG. 13 shows the adsorption efficiency of organochloro pesticides on a DVB/n-heptane porous monolith, in accordance with various embodiments.

Example 6. Adsorption and Desorption of Organochlorine Pesticides and Related Compounds A test solution containing nitrobenzene (1 ppm), 1-chloro-4-nitrobenzene (1 ppm), 1,4-dichlorobenzene (1 ppm), methoxychlor (1 ppm), pentachloronitrobenzene (1 ppm), 4,4'-DDT (2.5 ppm) and hexachlorobenzene (2.5 ppm) in 50% acetonitrile is prepared. A carrier consisting of a DVB/n-heptane porous monolith of (81 mg monolith not including the mass of the support) is immersed into 5 mL of the test solution and is ultrasonicated for one minute. After one minute, the carrier is removed and the remaining analytes in the test solution are determined by HPLC. This process is repeated four more times and each time the remaining analytes are determined by HPLC. The results are shown in FIG. 13. Notably, the more hydrophobic the analyte, the greater the retention on the hydrophobic carrier.

Figure 14:
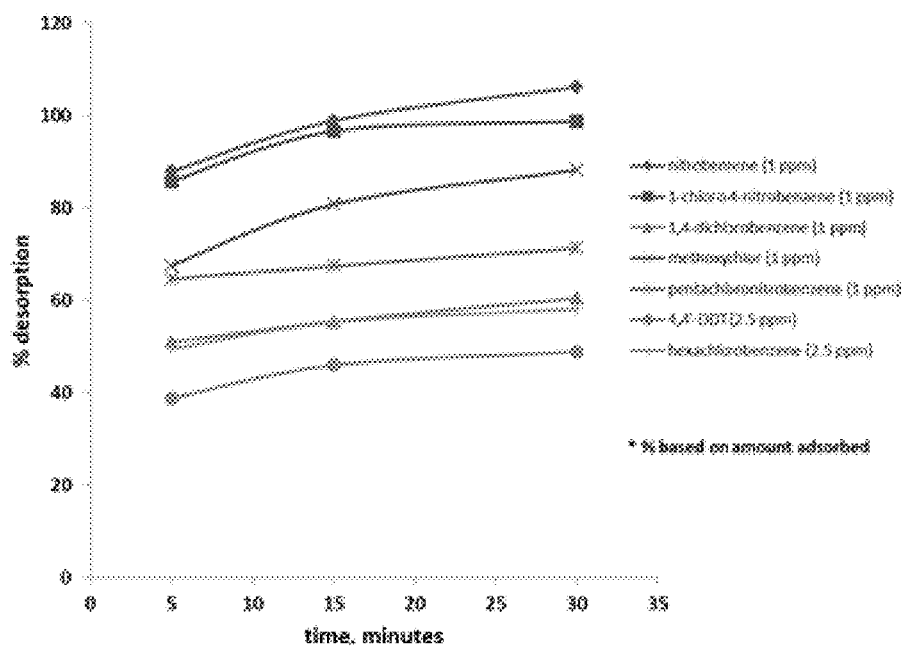
FIG. 14 shows the desorption efficiency of organochloro pesticides from a DVB/n-heptane porous monolith, in accordance with various embodiments.

The carrier with the adsorbed analytes is immersed into 5 mL of acetonitrile for five minutes to desorb the analytes. The solution is then analyzed by HPLC. The process is repeated at fifteen and thirty minutes. As shown in FIG. 14, the less hydrophobic analytes are more efficiently removed from the carrier. By using a more hydrophobic solvent such as THF, removal efficiency of the analytes from the carrier can be improved.

What is claimed is:

1. A carrier for adsorption of a compound, comprising:
   a support; and
   a shrink-fitted monolithic body attached to and surrounding at least a portion of the support, wherein the support is inert to prevent reactions with a polymer, a monomer solution or a sample solution.

2. The carrier of claim 1 wherein the shrink-fitted monolithic body is porous.

3. The carrier of claim 1 wherein the support is a rod.

4. The carrier of claim 1 wherein the support is a magnet or polymer coated magnet.

5. The carrier of claim 1 wherein the shrink-fitted monolithic body has an average thickness of not less than about 0.5 millimeters.

6. The carrier of claim 5 wherein the shrink-fitted monolithic body has an average thickness of not less than about 0.75 mm.

7. The carrier of claim 6 wherein the shrink-fitted monolithic body has an average thickness of not less than about 1.0 millimeters.

8. The carrier of claim 5 wherein the shrink-fitted monolithic body has an average thickness of not greater than about 100 millimeters.

9. The carrier of claim 1 wherein the shrink-fitted monolithic body is polymerized divinylbenzene.

10. The carrier of claim 1 wherein the at least a portion of the support is partially flattened.

11. A system for testing a sample for the presence of a compound, comprising:
    a carrier including:
       a support; and
       a shrink-fitted monolithic body attached to and surrounding at least a portion of the support, wherein the support is inert to prevent reactions with a polymer, a monomer solution or a sample solution; and
    a container including a cavity for holding a sample, wherein the shrink-fitted monolithic body sized to fit within the cavity and to be in contact with the sample.

12. The system of claim 11 wherein the support is a rod.

13. The system of claim 11 wherein the support is a magnet or polymer coated magnet.

14. The system of claim 11 wherein the shrink-fitted monolithic body has an average thickness of not less than about 0.5 millimeters.

15. The system of claim 14 wherein the shrink-fitted monolithic body has an average thickness of not greater than about 100 millimeters.

16. The system of claim 11 wherein the shrink-fitted monolithic body conforms to the shape of the cavity.

* * * * *